US012633650B2

(12) United States Patent
Ali et al.

(10) Patent No.: US 12,633,650 B2
(45) Date of Patent: May 19, 2026

(54) VEHICLE WI-FI SENSING WITH DYNAMIC ANTENNA SWITCHING

(71) Applicant: GM GLOBAL TECHNOLOGY OPERATIONS LLC, Detroit, MI (US)

(72) Inventors: Kamran Ali, Troy, MI (US); Joseph Philip McLaine, Troy, MI (US); Sean Taylor Coughlin, Shelby Township, MI (US); Nahel Eshaq, Rochester, MI (US); Duane S. Carper, Davison, MI (US); Lakshmi V. Thanayankizil, Troy, MI (US); Zachary Lemons, Lake Orion, MI (US); Bilal Charaf, Dearborn, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 110 days.

(21) Appl. No.: 18/621,559

(22) Filed: Mar. 29, 2024

(65) Prior Publication Data

US 2025/0309525 A1 Oct. 2, 2025

(51) Int. Cl.

*H01Q 1/32* (2006.01)
*H01Q 1/22* (2006.01)
*H01Q 21/28* (2006.01)

(52) U.S. Cl.

CPC ......... *H01Q 1/3233* (2013.01); *H01Q 1/2291* (2013.01); *H01Q 21/28* (2013.01)

(58) Field of Classification Search

CPC ...... H01Q 1/32; H01Q 1/3233; H01Q 1/2291; H01Q 21/28

See application file for complete search history.

(56) References Cited

U.S. PATENT DOCUMENTS 11,956,046 B2 4/2024 Ali et al.
12,091,019 B2 9/2024 Ali et al.
(Continued)

FOREIGN PATENT DOCUMENTS

DE 102016213689 A1 2/2018
DE 102022119526 A1 2/2024
EP 3960567 A1 * 3/2022 ............. G06V 40/15

OTHER PUBLICATIONS

U.S. Appl. No. 18/522,436, filed Nov. 29, 2023, Ali, Kamran.
Office Action from corresponding German Application No. 102024113174.8, dated Oct. 25, 2024.

*Primary Examiner* — Hoang V Nguyen

(57) ABSTRACT

A vehicle system includes Wi-Fi antennas positioned to focus on different regions of a vehicle, and a Wi-Fi sensor module. The Wi-Fi sensor module includes Wi-Fi sensor antennas in communication with the Wi-Fi antennas, a control module, a transceiver module in communication with the control module, and a switching device in communication with the control module and the transceiver module. The control module is configured to receive a sensing request for the vehicle, determine sensing requirements for the Wi-Fi sensor antennas based on the sensing request, control the switching device to sequentially connect the Wi-Fi sensor antennas to the transceiver module based on the sensing requirements, and control the transceiver module to sequentially transmit a Wi-Fi signal to one or more of the Wi-Fi antennas via each connected Wi-Fi sensor antenna. Other example vehicle systems and control methods for Wi-Fi sensing are also disclosed.

20 Claims, 4 Drawing Sheets

(56) References Cited

U.S. PATENT DOCUMENTS

| | | | | |
|---|---|---|---|---|
| 2014/0218186 | A1 | 8/2014 | Kawamoto | |
| 2023/0299829 | A1 * | 9/2023 | Ali ........................ | B60W 40/08 370/252 |
| 2023/0341535 | A1 | 10/2023 | Zhang et al. | |
| 2024/0414288 | A1 | 12/2024 | Ali | |

* cited by examiner

VEHICLE WI-FI SENSING WITH DYNAMIC ANTENNA SWITCHING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle Wi-Fi sensing, and more specifically to vehicle systems including Wi-Fi sensor antennas that are sequentially connected for transmitting and receiving Wi-Fi signals.

Vehicles often include detection systems for detecting objects in the vehicles. In some instances, the detection systems may rely on sensing techniques and/or devices for the detection of objects. For example, the detection systems may be a Wi-Fi Child Presence Detection (CPD) system that detects children in a vehicle through Wi-Fi sensing. In such examples, the Wi-Fi CPD system may detect activity, such as biological activity (e.g., breathing, etc.), movement, etc. in the vehicle via transmitted and received Wi-Fi signals, and then correlate the detected activity to the presence of a child.

SUMMARY

A vehicle system for Wi-Fi sensing in a vehicle, includes a plurality of Wi-Fi antennas positioned to focus on different regions of the vehicle, and a Wi-Fi sensor module. The Wi-Fi sensor module includes a plurality of Wi-Fi sensor antennas in communication with the plurality of Wi-Fi antennas, a control module, a transceiver module in communication with the control module, and a switching device in communication with the control module and the transceiver module. Each Wi-Fi sensor antenna of the Wi-Fi sensor antennas has at least one antenna characteristic that is different than another one of the Wi-Fi sensor antennas. The control module is configured to receive a sensing request for the vehicle, determine sensing requirements for the Wi-Fi sensor antennas based on the sensing request, and control the switching device to sequentially connect the Wi-Fi sensor antennas to the transceiver module based on the sensing requirements. One of the Wi-Fi sensor antennas is sequentially connected to the transceiver module at a time. The control module is further configured to control the transceiver module to sequentially transmit a Wi-Fi signal to one or more of the Wi-Fi antennas via each connected Wi-Fi sensor antenna.

In other features, the control module is configured to determine the sensing requirements based on the sensing request and antenna characteristics of the Wi-Fi sensor antennas.

In other features, the control module is configured to adjust a transmission power of at least one of the sequentially connected Wi-Fi sensor antennas.

In other features, the control module is configured to receive one or more reflected signals via the Wi-Fi sensor antennas and determine channel state information based on the one or more reflected signals.

In other features, the vehicle system further includes an alert module in communication with the control module, and the control module is configured to detect movement in the vehicle based on the CSI and transmit an alert signal to the alert module indicative of the detected movement.

In other features, the alert module is configured to generate a vehicle signal indicative of the detected movement in response to the alert signal.

In other features, the antenna characteristic includes at least one of a radiation pattern, a gain, and a directivity.

In other features, the Wi-Fi antennas include at least a first Wi-Fi antenna positioned to focus on a front cabin portion of the vehicle, and a second Wi-Fi antenna positioned to focus on a rear cabin portion of the vehicle.

In other features, the control module is configured to determine whether the vehicle is parked, and in response to determining that the vehicle is parked, control the switching device to sequentially connect the Wi-Fi sensor antennas to the transceiver module based on the sensing requirements.

In other features, the control module is configured to control the switching device to sequentially connect each of the Wi-Fi sensor antennas to the transceiver module based on the sensing requirements within a defined period of time.

In other features, the defined period of time is less than ten seconds.

In other features, the Wi-Fi antennas include at least one auxiliary Wi-Fi antenna configured to be used with a sensing application external to the vehicle, and the control module is configured to control the transceiver module to transmit a Wi-Fi signal to the auxiliary Wi-Fi antenna after each of the Wi-Fi sensor antennas has been connected to the transceiver module.

In other features, a vehicle includes the vehicle system.

A control method for Wi-Fi sensing with a Wi-Fi sensor module is disclosed. The Wi-Fi sensor module includes a switching device, a transceiver module, and a plurality of Wi-Fi sensor antennas in communication with a plurality of Wi-Fi antennas positioned to focus on different regions of a vehicle. The control method includes receiving a sensing request for the vehicle, determining sensing requirements for the Wi-Fi sensor antennas based on the sensing request, and controlling the switching device to sequentially connect the Wi-Fi sensor antennas to the transceiver module based on the sensing requirements. One of the Wi-Fi sensor antennas is sequentially connected to the transceiver module at a time and each Wi-Fi sensor antenna of the Wi-Fi sensor antennas has at least one antenna characteristic that is different than another one of the Wi-Fi sensor antennas. The control method further includes controlling the transceiver module to sequentially transmit a Wi-Fi signal to one or more of the Wi-Fi antennas via each connected Wi-Fi sensor antenna.

In other features, determining the sensing requirements includes determining the sensing requirements based on the sensing request and antenna characteristics of the Wi-Fi sensor antennas.

In other features, the control method further includes adjusting a transmission power of at least one of the sequentially connected Wi-Fi sensor antennas.

In other features, the control method further includes receiving one or more reflected signals via the Wi-Fi sensor antennas, determining CSI based on the one or more reflected signals, detecting movement in the vehicle based on the CSI, and generating a vehicle signal based on the detected movement.

In other features, the antenna characteristic includes at least one of a radiation pattern, a gain, and a directivity.

In other features, the control method further includes determining whether the vehicle is parked.

In other features, controlling the switching device to sequentially connect the Wi-Fi sensor antennas to the transceiver module based on the sensing requirements includes controlling the switching device to sequentially connect the Wi-Fi sensor antennas to the transceiver module in response to determining that the vehicle is parked.

In other features, the Wi-Fi antennas include at least one auxiliary Wi-Fi antenna configured to be used with a sensing application external to the vehicle In other features, the control method further includes controlling the transceiver module to transmit a Wi-Fi signal to the auxiliary Wi-Fi antenna after each of the Wi-Fi sensor antennas has been connected to the transceiver module.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle may include detection systems for detecting objects in the vehicles based on Wi-Fi sensing. In such examples, a Wi-Fi sensing device may transmit signals to antennas in the vehicle and receive reflected signals to detect activity in the vehicle. Often, spatial coverage of the signals does not adequately cover desired regions in the vehicle, such as in a rear cabin portion of the vehicle where a child may be present. Additionally, external disturbances, such as noise in the vehicle may degrade the signals and/or the spatial coverage thereof. In some instances, the inadequate spatial coverage of the signals and/or the external disturbances may lead to missed detections (e.g., objects, such as a child not being detected) and/or false positive detections.

The vehicle systems and methods according to the present disclosure provide solutions for leveraging communication signals for focused Wi-Fi sensing in a vehicle to accurately detect motion and/or objects in the vehicle. For example, and as further explained herein, the vehicle systems and methods herein use dynamic switching between Wi-Fi antennas having different antenna characteristics (e.g., radiation pattern, etc.) and in some instances dynamic power transmission control to ensure adequate and focused sensing coverage on regions of interest within and/or outside of the vehicle. In such examples, the dynamic control of the Wi-Fi sensor antennas and strategic positioning of communicating Wi-Fi antennas may improve spatial coverage of wireless signals and sensing signal-to-noise ratios, thereby reducing missed detections. Additionally, the dynamic control and positioning of the antennas enables focused sensing to reduce false positives. For example, without focused sensing, the improved spatial coverage and signal-to-noise ratios may lead to false positives if signals leak outside the vehicle and lead to detection of unwanted motion and/or objects. In some examples, the Wi-Fi sensing may be achieved by leveraging low-cost Wi-Fi hardware (e.g., a Wi-Fi chip without multiple-input and multiple-output (MIMO) capabilities).

Figure 1:
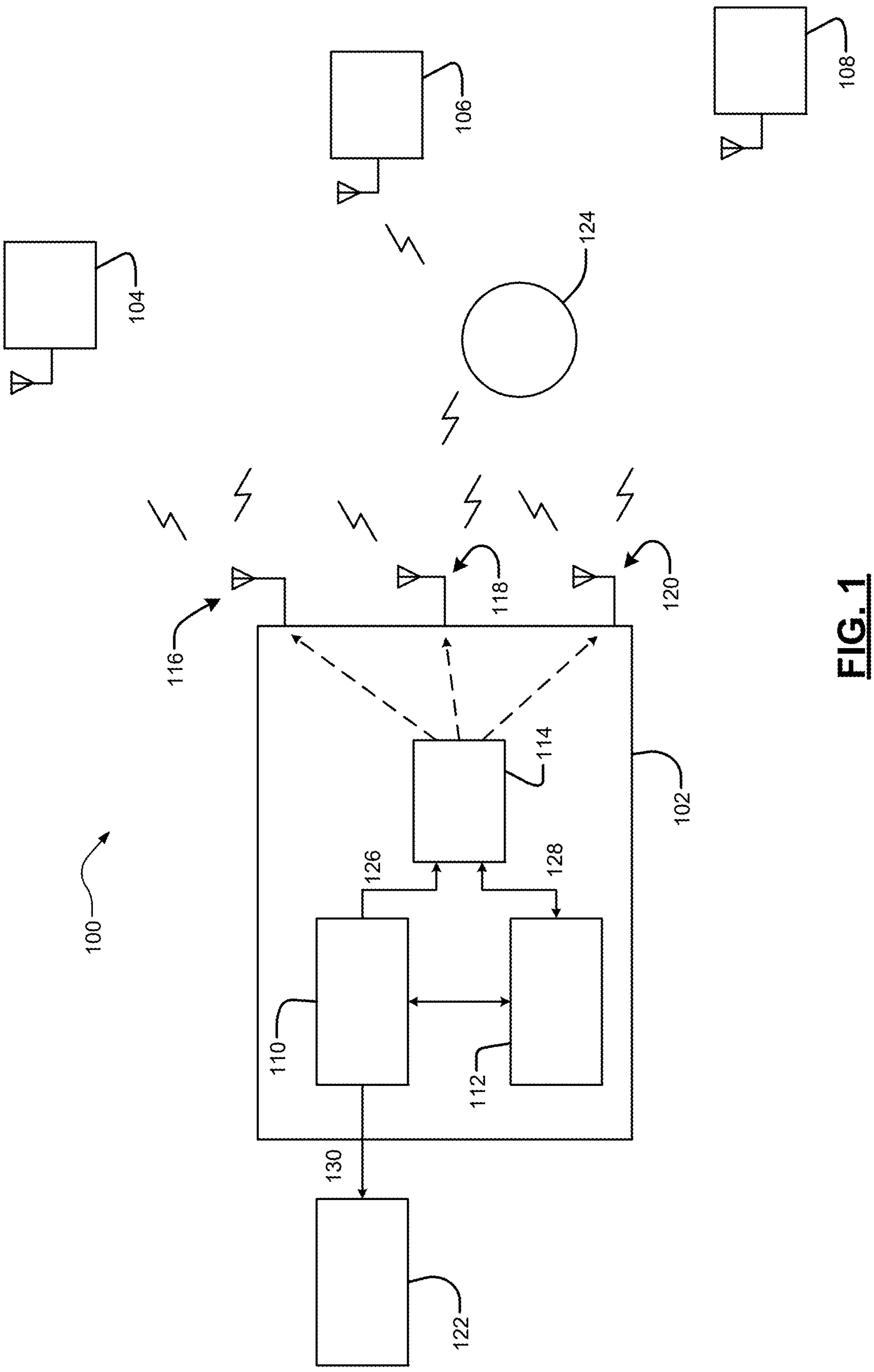
FIG. 1 is a block diagram of an example vehicle system including a Wi-Fi sensor module and antennas for Wi-Fi sensing in a vehicle, according to the present disclosure.

Referring now to FIG. 1, a block diagram of an example vehicle system 100 is presented for Wi-Fi sensing in a vehicle. As shown in FIG. 1, the vehicle system 100 generally includes a Wi-Fi sensor module 102, multiple Wi-Fi antennas 104, 106, 108, and an optional alert module 122. In such examples, the Wi-Fi sensor module 102 includes a control module 110, a transceiver module 112 in communication with the control module 110, a switching device 114 in communication with the control module 110 and the transceiver module 112, and multiple Wi-Fi sensor antennas 116, 118, 120 in communication with the Wi-Fi antennas 104, 106, 108.

Although FIG. 1 illustrates the vehicle system 100 as including specific modules and/or antennas, it should be appreciated that the vehicle system 100 and/or other systems herein may include one or more other modules and/or antennas (e.g., having the same or different functionalities) if desired. For example, while the vehicle system 100 is described and shown as having three Wi-Fi antennas 104, 106, 108 and three Wi-Fi sensor antennas 116, 118, 120, the vehicle system 100 may include more or less Wi-Fi antennas and/or Wi-Fi sensor antennas. Additionally, while the vehicle system 100 is shown as including one Wi-Fi sensor module 102 generally positioned in a vehicle, it should be appreciated that the Wi-Fi sensor module 102 may be positioned outside of the vehicle and/or the vehicle system 100 may include another Wi-Fi sensor module positioned outside of the vehicle. Further, the vehicle system 100 is shown as including multiple separate modules. In other embodiments, any combination of the modules (e.g., the control module 110, the transceiver module 112, the alert module 122, etc.) and/or the functionality thereof may be integrated into one or more modules.

Figure 2:
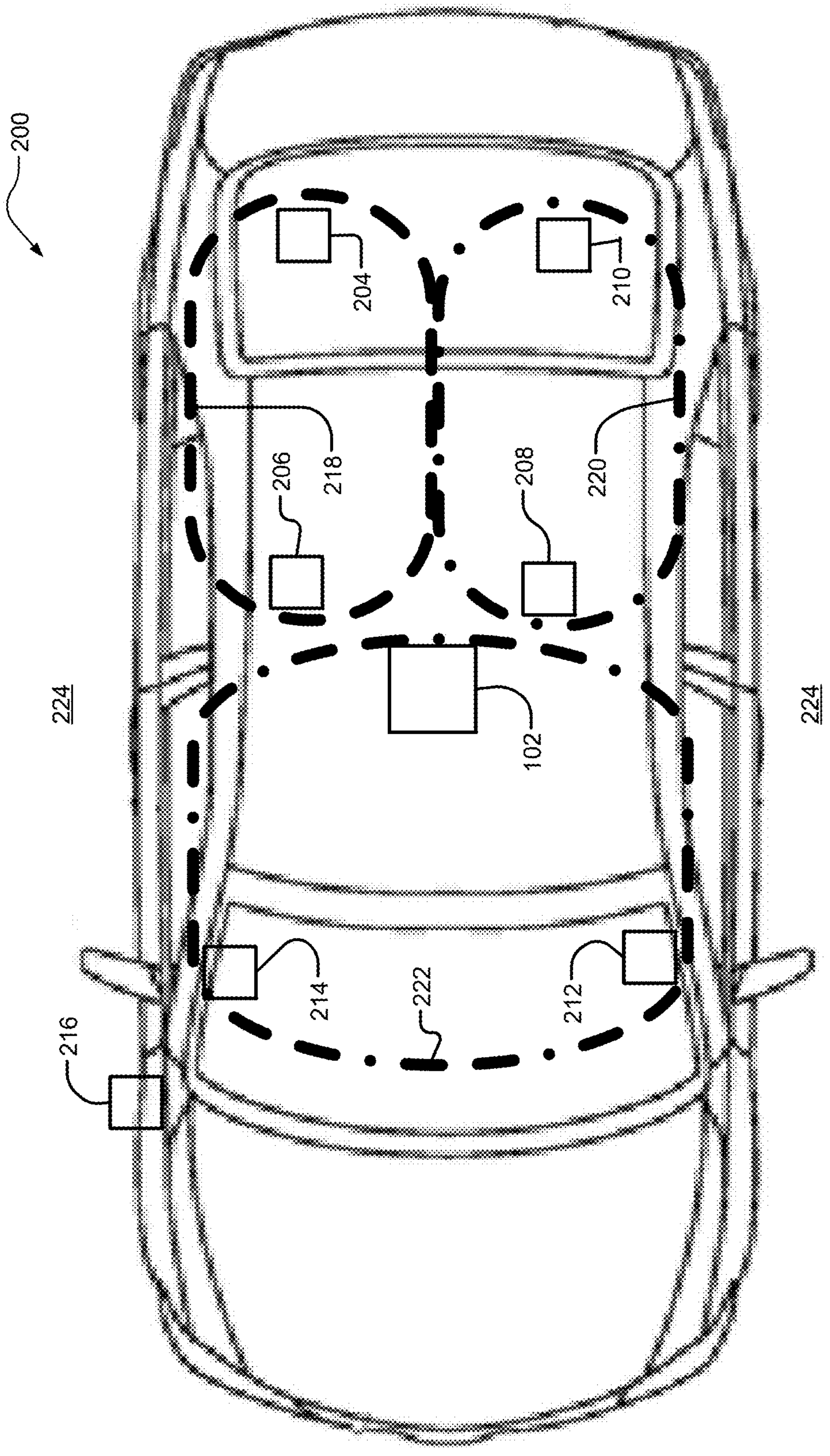
FIG. 2 is a vehicle including portions of the vehicle system of FIG. 1, according to the present disclosure.

In various embodiments, the vehicle system 100 of FIG. 1 may be employable in any suitable vehicle, such as an electric vehicle (e.g., a pure electric vehicle, a plug-in hybrid electric vehicle, etc.), an internal combustion engine vehicle, etc. Additionally, the vehicle system 100 may be applicable to an autonomous vehicle, a semi-autonomous vehicle, etc. For example, FIG. 2 depicts a vehicle 200 including the Wi-Fi sensor module 102 of FIG. 1 and Wi-Fi antennas 204, 206, 208, 210, 212, 214, 216 in communication with the Wi-Fi sensor module 102. In such examples, the Wi-Fi antennas 204, 206, 208, 210, 212, 214, 216 may be similar and function in a similar manner as the Wi-Fi antennas 104, 106, 108 of FIG. 1.

With continued reference to FIG. 1, the Wi-Fi sensor module 102 and the Wi-Fi antennas 104, 106, 108 may be any suitable devices. For example, the Wi-Fi sensor module 102 may be a standalone IoT device with its own Wi-Fi sensor antennas 116, 118, 120. In such examples, the transceiver module 112 of the Wi-Fi sensor module 102 may include transmitter and receiver components for generating wirelessly signals for transmission to the Wi-Fi antennas 104, 106, 108 via the Wi-Fi sensor antennas 116, 118, 120, and receiving wirelessly signals from the Wi-Fi antennas 104, 106, 108 via the Wi-Fi sensor antennas 116, 118, 120. Additionally, the switching device 114 may be any suitable device, such as an RF switch, etc. for routing signals between the transceiver module 112 and selected ones of the Wi-Fi sensor antennas 116, 118, 120 and corresponding matching networks (not shown in FIG. 1).

In some examples, characteristics associated with the transceiver module 112 and/or the vehicle's Wi-Fi may be adjustable as desired. For instance, each Wi-Fi antenna 104, 106, 108 associated with the vehicle's Wi-Fi may include or be in communication with a transceiver module that functions in a similar manner as the transceiver module 112 and its associated Wi-Fi sensor antennas 116, 118, 120.

For example, the transceiver module 112 may include a power converter for adjusting a transmission power of the Wi-Fi sensor antennas 116, 118, 120, as further explained herein. Additionally, in various embodiments, the sensitivity of the receiver in the transceiver module 112 may be adjusted. By adjusting the sensitivity of the receiver, a sensitivity threshold for incoming signals may be controlled. For example, lowering a sensitivity threshold can cause the receiver to be more selective (e.g., only detecting signals above a certain amplitude or signal-to-noise ratio). This can help filter out weaker signals from targets located outside the vehicle and focus the radar's attention on stronger signals originating from targets within one or more of desired regions in the vehicle.

Similarly, a transmission power and/or a sensitivity associated with each Wi-Fi antenna 104, 106, 108 may be adjusted as desired. This may be accomplished in a similar manner as described above relative to the transceiver module 112. For example, transceiver modules associated with the Wi-Fi antenna 104, 106, 108 may be controlled to adjust a transmission power of each Wi-Fi antenna 104, 106, 108 and/or to adjust the sensitivity.

Additionally, the Wi-Fi antennas 104, 106, 108 (and the Wi-Fi antennas 204, 206, 208, 210, 212, 214, 216 of FIG. 2) may be native antennas in the vehicle (e.g., vehicle Wi-Fi antennas). In various embodiments, the Wi-Fi antennas are mounted on the vehicle and may be regionalized/focused on regions of interest relative to the vehicle. Additionally and/or alternatively, the Wi-Fi antennas mounted on the vehicle may be regionalized/focused on regions of interest exterior to the vehicle.

In some examples, the Wi-Fi antennas may be or a part of communication modules built-into the vehicle's wireless communication system that supports connectivity for other purposes (e.g., sharing internet, etc.). In such examples, the Wi-Fi sensor module 102 communicates via its switchable Wi-Fi sensor antennas 116, 118, 120 (as further explained herein) with the vehicle's built-in Wi-Fi antennas (e.g., the Wi-Fi antennas 104, 106, 108 of FIG. 1, the Wi-Fi antennas 204, 206, 208, 210, 212, 214, 216 of FIG. 2, etc.) to perform Wi-Fi sensing.

In the example of FIG. 1, the Wi-Fi sensor antennas 116, 118, 120 of the Wi-Fi sensor module 102 may include differing antenna characteristics. For example, the differing antenna characteristics of the Wi-Fi sensor antennas 116, 118, 120 may include at least one of a radiation pattern, a gain, and a directivity. For instance, each Wi-Fi sensor antenna 116, 118, 120 may have a distinct radiation pattern, gain, and/or directivity that is different than the other Wi-Fi sensor antennas 116, 118, 120. As such, each Wi-Fi sensor antenna 116, 118, 120 may be selected for use in the vehicle based on its distinct antenna characteristics to achieve a desired radiation pattern (e.g., spatial coverage) of the vehicle system 100. As one example, the Wi-Fi sensor antenna 116 may have a different radiation pattern than the other Wi-Fi sensor antenna(s) 118, 120, the Wi-Fi sensor antenna 118 may have a different gain than the Wi-Fi sensor antenna(s) 116, 120, the Wi-Fi sensor antenna 120 may have a different directivity than the Wi-Fi sensor antenna(s) 116, 118, etc. In some examples, the Wi-Fi sensor antennas 116, 118, 120 may have controllable parameters, such as orientation, radiation pattern, etc.

In various embodiments, the Wi-Fi antennas 104, 106, 108 may be positioned to focus on different regions of the vehicle (e.g., all sensing areas of interest). For example, and as shown in FIG. 2, the Wi-Fi antennas 204, 206 are positioned to focus on a rear, passenger side cabin portion of the vehicle 200 and generally used for sensing in a region 218 in the vehicle 200. Similarly, the Wi-Fi antennas 208, 210 of FIG. 2 are positioned to focus on a rear, driver side cabin portion of the vehicle 200 and generally used for sensing in a region 220 in the vehicle 200. The Wi-Fi antennas 212, 214 are positioned to focus on a front cabin portion of the vehicle 200 and generally used for sensing in a region 222 in the vehicle 200. Additionally, and as further explained below, the Wi-Fi antenna 216 may be employed with a sensing application external to the vehicle 200. In such examples, the Wi-Fi antenna 216 may be used for sensing in a region 224 outside of the vehicle 200.

In some examples, placement of the Wi-Fi antennas 104, 106, 108 of FIG. 1 in the vehicle may be determined based on different factors. For example, each Wi-Fi antenna 104, 106, 108 may be strategically positioned to focus on different regions of the vehicle based on antenna characteristics of the Wi-Fi sensor antennas 116, 118, 120, a corresponding sensing signal-to-noise ratio (SSNR), etc. In some examples, the position of the Wi-Fi antennas 104, 106, 108 may be optimized for communication purposes and not sensing purposes. In other examples, the position of the Wi-Fi antennas 104, 106, 108 may be optimized for both communication and sensing aspects. Placement of the Wi-Fi antennas 204, 206, 208, 210, 212, 214, 216 of FIG. 2 in the vehicle 200 may be determined in a similar manner.

For example, the SSNR metric may be leveraged to determine the sensing capacity of the vehicle system 100. For instance, in Wi-Fi sensing, the dynamic signals reflected from a target contain motion sensing information needed for detection purposes. Put another way, static signals (e.g., line-of-sight direct signals from the Wi-Fi antennas 104, 106, 108 and reflections from vehicle walls or other static components of the vehicle) do not contain information about the target to enable detection and tracking of that target. As such, in such Wi-Fi sensing, the SSNR may be defined as the ratio of the power of a dynamic signal reflected from a target of interest and the combined power of thermal noise, RF interference, and other dynamic objects that are not of interest. Assuming there is only one target of interest (e.g., a child present sleeping in the car), the sensing capacity of the vehicle system 100 may be related to a distance between transceivers (e.g., between one of the Wi-Fi sensor antennas 116, 118, 120 and one of the Wi-Fi antennas 104, 106, 108) and the target's distance to the transceivers. This relationship is shown in equation (1) below, where $\gamma_D$ is a distance between transceivers (e.g., the distance between the Wi-Fi sensor antenna 118 and the Wi-Fi antenna 106 of FIG. 1), $\gamma_R$ is a distance between a target and the vehicle transceiver (e.g., the distance between a target 124 and the Wi-Fi antenna 106), and $\gamma_T$ is a distance between the target and the Wi-Fi sensor transceiver (e.g., the distance between the target 124 and the Wi-Fi sensor antenna 118). In such examples, $\gamma_T$ represents the distance a dynamic signal reflected from the target 124 travels to the Wi-Fi sensor antenna 118.

$$SSNR \propto \frac{\gamma_D}{(\gamma_T * \gamma_R)^2} \qquad \text{Equation (1)}$$

In such examples, the combination of different types of Wi-Fi sensor antennas 116, 118, 120 having different antenna characteristics (e.g., radiation pattern, gain, and directivity) may be employed to reach all sensing areas of interest. Then, the SSNR metrics can be leveraged to optimize the placement of each Wi-Fi antenna 104, 106, 108 for particular sensing applications (e.g., CPD applications, occupant presence and motion applications, security applications, etc.). As such, by enabling sensing across multiple different antenna links between the Wi-Fi sensor antennas 116, 118, 120 and the Wi-Fi antennas 104, 106, 108 (via the switching device 114, sensing coverage may be controlled by complementing each antenna link's sensing capacity. In some embodiments, sensing coverage can be further controlled via antenna placement, antenna designs with different radiation patterns, directivity, and gains, and transmit power control over each specific link.

In various embodiments, the control module 110 may receive a sensing request for the vehicle. For example, the sensing request may be provided to the control module 110 by a particular sensing application in the vehicle (e.g., a CPD application in the vehicle, an occupant presence and motion application, a security application, etc.). For instance, the sensing application may request, for example, N sensing rounds for one or more specific regions or all regions in the vehicle (e.g., the region 218 in the vehicle 200 of FIG. 2). In such examples, the N sensing rounds may represent a defined number of cycles in which each Wi-Fi antenna in the specific region(s) is utilized. For example, and with reference to FIG. 2, if the N sensing rounds is equal to four and the specific region in the vehicle is the region 218, the Wi-Fi sensor module 102 performs four cycles with each cycle including a sequentially signal transmission to each Wi-Fi antenna 204, 206.

Then, the control module 110 may determine sensing requirements for the Wi-Fi sensor antennas 116, 118, 120. In various embodiments, the sensing sequence requirement may be determined based on, for example, the received sensing request. In other examples, the sensing sequence requirement may be determined based on the received sensing request and antenna characteristics of the Wi-Fi sensor antennas 116, 118, 120. For example, the control module 110 may implement a defined algorithm specific to a particular vehicle (e.g., the vehicle manufacturer, make, model, etc.) to determine an optimal combination and switching sequence of Wi-Fi sensor antennas to utilize and their individual parameters (e.g., radiation pattern, transmit power, etc.) to achieve a desired coverage. In such embodiments, the algorithm may take into account the received sensing request and specific characteristics of each antenna.

In some examples, the sensing requirements may relate to various parameters for completing the received sensing request. For example, the sensing requirements determined by the control module 110 may include an antenna switching schedule. In such examples, the antenna switching schedule may include a defined sequence for selectively connecting one of the Wi-Fi sensor antennas 116, 118, 120 to the transceiver module 112 and then linking that selected Wi-Fi sensor antenna to one or more of the Wi-Fi antennas 104, 106, 108. In other examples, the defined sequence may provide for selectively connecting one of the Wi-Fi sensor antennas 116, 118, 120 to the transceiver module 112 and then enable that selected Wi-Fi sensor antenna to communicate with all of the Wi-Fi antennas 104, 106, 108. In such examples, each Wi-Fi antenna 104, 106, 108 may communicate with the selected Wi-Fi sensor antenna consecutively (e.g., one at a time) or simultaneously, Additionally, the sensing requirements determined by the control module 110 may include, for example, a transmission power (Tx power) control parameter for each antenna link in the antenna switching schedule. In such examples, the transmission power provided to each connected Wi-Fi sensor antenna 116, 118, 120 may be adjustable to alter a radiation pattern of that Wi-Fi sensor antenna 116, 118, 120. In some examples, the transmission power may be the same for each antenna link or at least one of the antenna links may have a different transmission power. Further, in embodiments, the determined sensing requirements may include sampling criteria, such as a sensing interval and/or a sensing slot for each of the Wi-Fi sensor antennas 116, 118, 120. In such examples, the sensing interval may define how fast the sensing is completed for each Wi-Fi sensor antenna 116, 118, 120 and the sensing slot may define how long the sensing takes place in a particular region in the vehicle.

Further, sensing can happen when the Wi-Fi sensor antennas 116, 118, 120 transmit signals and the Wi-Fi antennas 104, 106, 108 receive signals, and also when the Wi-Fi antennas 104, 106, 108 transmit signals and the Wi-Fi sensor antennas 116, 118, 120 receive signals. As such, transmission power (Tx power) control parameters and/or sensitivity control aspects associated with the Wi-Fi antennas 104, 106, 108 may be adjusted according to, for example, the sensing requirements, as explained herein.

Next, the control module 110 may instantiate the sensing request based on the determined sensing requirements. For example, the determined antenna switching schedule may be implemented for sequentially connecting one of the Wi-Fi sensor antennas 116, 118, 120 to the transceiver module 112 and then linking that selected Wi-Fi sensor antenna to one or more (and sometimes all) of the Wi-Fi antennas 104, 106, 108. In such examples, the control module 110 may control the switching device 114 (e.g., via a control signal 126) to sequentially connect the Wi-Fi sensor antennas 116, 118, 120 to the transceiver module 112 based on the sensing requirements. In such examples, one of the Wi-Fi sensor antennas 116, 118, 120 is sequentially connected to the transceiver module 112 at a time.

Then, the control module 110 may control the transceiver module 112 to sequentially transmit a Wi-Fi signal to one or more (and sometimes all) of the Wi-Fi antennas 104, 106, 108 via each connected Wi-Fi sensor antenna 116, 118, 120. For example, once the transceiver module 112 is connected to one of the Wi-Fi sensor antennas 116, 118, 120, the transceiver module 112 may transmit a Tx signal to one or more of the Wi-Fi antennas 104, 106, 108 linked to that Wi-Fi sensor antenna. Then, once the next one of the Wi-Fi sensor antennas 116, 118, 120 is connected, the transceiver module 112 may transmit a Tx signal to one or more of its linked Wi-Fi antenna 104, 106, 108, and so on. Such switching between the Wi-Fi sensor antennas 104 106, 108 and signal transmission to the one or more Wi-Fi antennas 116, 118, 120 may occur until the N sensing rounds of the sensing request is complete.

In some examples, the control module 110 may alter other parameters of the Wi-Fi sensor antennas 116, 118, 120, such as an orientation and/or radiation pattern. For instance, the control module 110 may adjust the transmission power (Tx power) of at least one of the sequentially connected Wi-Fi sensor antennas 116, 118, 120 to change the radiation pattern of that Wi-Fi sensor antenna. Such adjustment may be based on the transmission power control parameter of the determined the sensing requirements explained above. In such examples, the control module 110 may transmit a signal to the transceiver module 112, thereby causing the transceiver module 112 to adjust the transmission power provided to the connected Wi-Fi sensor antenna 116, 118, 120 (via the switching device 114). In various embodiments, the transceiver module 112 may control its power converter (e.g., a power amplifier, etc.) to adjust the transmission power.

Additionally, in some examples, the control module 110 may alter the receive sensitivity associated the Wi-Fi sensor antennas 116, 118, 120 to filter out weak signals, as explained above. Further, and as explained above, the transmission power (Tx power) and/or receive sensitivity associated with the Wi-Fi antenna 104, 106, 108 may be adjusted as desired.

Further, in some examples, the instantiation of the sensing request may only take place if one or more vehicle conditions apply. For example, the determined antenna switching schedule may be implemented only if the vehicle is in park. In such examples, the control module 110 may determine whether the vehicle is parked. In some embodiments, this determination may be made based on, for example, a sensed parameter (e.g., a parameter associated with the vehicle's transmission, a velocity sensor, etc.), a received signal indicating the vehicle is in park, etc. Then, in response to determining that the vehicle is parked, the control module 110 may proceed to control the switching device 114 to sequentially connect the Wi-Fi sensor antennas 116, 118, 120 as explained above.

In various embodiments, the sequentially connecting of the Wi-Fi sensor antennas 116, 118, 120 to the transceiver module 112 may occur within a defined period of time. For example, the sensing requirements may define particular sampling criteria, as explained above. The control module 110 may control the switching device 114 to sequentially connect the Wi-Fi sensor antennas 116, 118, 120 to the transceiver module 112 within a defined period of time in accordance with the sampling criteria. In some examples, the defined period of time may be any suitable time period based on, for example, how fast the sensing should take, how criteria the sensing is, etc. In various embodiments, the defined period of time may be any suitable amount of time. In some examples, the defined period of time may be, for example, less than about ten seconds, more than about three seconds, etc.

In some embodiments, the vehicle system 100 of FIG. 1 may implement external Wi-Fi sensing applications after the sensing request is complete. For example, and with reference to FIG. 2, the Wi-Fi antenna 216 may be an auxiliary Wi-Fi antenna for use with a sensing application (e.g., a security application, such as a theft application, etc.) external to the vehicle 200. In such examples, the control module 110 of the Wi-Fi sensor module 102 may control the transceiver module 112 to transmit a Wi-Fi signal to the Wi-Fi antenna 216 (or the auxiliary Wi-Fi antenna) after the sensing request is complete (e.g., after each of the Wi-Fi sensor antennas 116, 118, 120 has been connected to the transceiver module 112). In other examples, the transceiver module 112 may be controlled to transmit a Wi-Fi signal to one or more of the Wi-Fi antennas 104, 106, 108 and that has a focus on a region (e.g., the region 224) exterior to the vehicle. With this configuration, the Wi-Fi signal to the Wi-Fi antenna 216 and/or one of other Wi-Fi antennas may be used for external sensing. For example, the Wi-Fi signal may be used to activate a camera, a motion sensor, etc. to detect movement in the region 224 outside of the vehicle 200 (e.g., while the vehicle 200 is parked). For example, the region 224 may include areas of interest, such as a truck bed, undercar, wheel wells, etc. In some examples, the external sensing application (e.g., a security application, etc.) may utilize information from the external sensing and coordinated modeling with a region of interest camera to determine a theft capability, etc.

While the vehicle 200 of FIG. 2 is shown as only including one auxiliary Wi-Fi antenna, it should be appreciated that the vehicle 200 may include more auxiliary Wi-Fi antennas for use with one or more sensing applications external to the vehicle 200.

With continued reference to FIG. 1, the Wi-Fi sensor module 102 may receive signals after transmitting the Wi-Fi signal to one or more of the Wi-Fi antennas 104, 106, 108. For example, after a Wi-Fi signal is transmitted via one of the Wi-Fi sensor antennas 116, 118, 120 at a time, that Wi-Fi sensor antenna may receive a signal (e.g., a static signal) directly from one or more of the linked Wi-Fi antenna 104, 106, 108 and/or one or more reflected signals. For instance, when the Wi-Fi sensor antenna 118 of FIG. 1 transmits a Wi-Fi signal, the Wi-Fi antenna 106 (among other Wi-Fi antennas) may receive the Wi-Fi signal and then transmit a signal having a radiation pattern that causes the signal to pass directly to the Wi-Fi sensor antenna 118 (e.g., a static signal) and to pass to other objects in the vehicle, such as walls, children, etc. In this example, the signal from the Wi-Fi antenna 106 may be directed towards the target 124. In such cases, a reflected signal (e.g., a dynamic signal) is generated from the interaction with the target 124 and received by the Wi-Fi sensor antenna 118, as shown in FIG. 1. Similar reflected signals may be received via other linked antennas in the vehicle system 100 of FIG. 1.

In some examples, the Wi-Fi sensor module 102 may pair and/or may have previously paired with a Wi-Fi signal from a Wi-Fi antenna associated with one or more external, non-vehicle devices, such as a cell phone. In such examples, the Wi-Fi sensor module 102 could receive pings or CSI comms from the non-vehicle device and look for distortions and make targeted detections based on the pings or CSI comms from the non-vehicle device. As such, the external, non-vehicle device(s) may provide similar functionality as the Wi-Fi antennas 104, 106, 108 and be implemented as non-native antennas.

Then, the control module 110 may process the received reflected signal(s) to detect possible targets of interest (e.g., a child). For example, the reflected signal(s) may be received by the control module 110 via the Wi-Fi antennas 104, 106, 108 and the transceiver module 112. Then, the control module 110 may determine channel state information (CSI) based on the received reflected signal(s).

For example, the control module 110 may analyze the received reflected signal(s) to detect changes from moving objects, which can be tracked by processing CSI of Wi-Fi packets of the received reflected signal(s). In such examples, Wi-Fi sensing uses existing Wi-Fi signals to detect events or changes in the environment via CSI computed at the physical (PHY) layer for each Wi-Fi packet. In various embodiments, CSI can be estimated using different techniques, such as intra-band sensing and inter-band sensing. Intra-band sensing can be performed in a connected mode and a passive mode. In the connected mode, a Wi-Fi device (e.g., the Wi-Fi sensor module 102) is connected to another Wi-Fi device in a (STA/AP) configuration. In such scenarios, CSI can be estimated on both sides as the devices communicate with each other. In the passive mode, a Wi-Fi device (e.g., the Wi-Fi sensor module 102) passively listens for preamble frames on a given channel which can be used for CSI estimation. For inter-band sensing, another device (e.g., a converter device) is used to up/down convert a signal from one band to another band, meanwhile sensing the channel in the middle for CSI estimation.

The CSI may be processed to detect changes from moving objects and therefore potential targets of interest. For example, CSI is a time-varying complex valued signal having a static component and a dynamic component. The static component corresponds to all non-user multipath reflections (e.g., the crest factor reduction (CFR) when there is no interference due movement in the environment) and the dynamic component corresponds to changes due to motion in the environment. In such examples, the CSI time-series signal may be processed into a simplified quantity that can then be used to detect motion and trigger recording.

For example, the CSI time-series signal may undergo signal processing for a low fidelity motion marker to isolate the dynamic component. As one example, the static component of the signal may be removed by differentiating the CSI signal over time (e.g., take a first order difference of consecutive CSI values). Then, a magnitude of the differentiated CSI values may be employed to remove noisy phases, thereby allowing the processing to focus only on the magnitude of the signals (and not noise). Next, a norm (e.g., square-root of the squared sum) of the CSI magnitudes corresponding to all available Wi-Fi subcarriers (sub-frequencies) may be determined. Then, the norm values obtained over time (moving median and moving average) may be filtered to obtain a time averaged norm signal. If the norm signal changes beyond a threshold (e.g., 3 times within a 3 second window, etc.), an alert may be triggered, a camera may be triggered to begin recording, etc.

In various embodiments, the vehicle system 100 may leverage multiple channels for higher bandwidth sensing. For example, Wi-Fi modules (e.g., the Wi-Fi sensor module 102 of FIG. 1) can operate at (a) multiple channels (e.g., channels 6 and 11 in 2.4 GHz band) and (b) multiple central frequency bands (e.g., 2.4 GHz, 5 GHZ, 6 GHZ). In such examples, each possible combination of a frequency band and channel gives access to a certain bandwidth that can be leveraged for sensing. Such different combinations may be analyzed in time as many in-cabin Wi-Fi sensing applications do not have real-time requirements. For example, in CPD applications, a time period of 10-20 seconds may be provided to acquire signals and make a decision. This time period provides enough time to sample using signals across multiple bands and channels. Additionally, the bandwidth directly impacts spatial resolution. For example, a 20 MHz channel may put multiple spatial reflections into a single bin compared to a 100 MHz channel. For each transmit/receive pair, the communication/sensing channel can be switched via channel switch announcement (CSA) message in the Wi-Fi standard.

In such examples, the CSI samples from adjacent Wi-Fi channels can be stitched together and then converted from frequency domain to a Power Delay Profile (PDF) in time domain. As one example, this may be done by applying an Inverse Fast Fourier Transform (IFFT) on the combined CSI information. Some interpolation along the frequency domain may be required to achieve this stitching. In such examples, an X-axis (time) of each PDF may provide the different delays of the paths a signal has travelled on before reaching the receiver (e.g., one of the Wi-Fi sensor antennas 116, 118, 120 of FIG. 1). With such configurations, sampling CSI across multiple Wi-Fi frequency bands and channels increases PDF's time resolution, which in turn helps identify more delay-bins or "paths" to look for the target signal of interest.

In some examples, a 2D time-series of multiple PDFs may be obtained when multiple sensing rounds are performed. In such examples, each PDF may equate to a path corresponding to, for example, a breathing signal. In various embodiments, these time-series of PDFs can then be further processed to look for signals of interest (e.g., computing the spectrogram by applying Fast Fourier Transform (FFT) across time to obtain Doppler). In some examples, to remove the impact of static reflections, the mean of each delay bin can be subtracted from its time series. Additionally, in some examples, the number of dimensions of the time-series may be reduced by employing techniques, such as a Principal Component Analysis (PCA), etc. In such examples, the time-series corresponding to each delay bin may be ranked according to a metric (e.g., its variance, power, skewness, kurtosis, etc.) and removed.

With continued reference to FIG. 1, in some embodiments a vehicle signal (e.g., a visual/audible warning, a message, etc.) may be generated in response to a detection of motion and/or an object in the vehicle based on the CSI. For example, the control module 110 of FIG. 1 or another suitable control module external to the Wi-Fi sensor module 102 may detect motion in the vehicle based on the CSI as explained above. Once a detection is made, the control module 110 may transmit an alert signal 130 to the alert module 122 indicative of the detected motion. Then, in some embodiments, the alert module 122 may generate and output a vehicle signal indicative of the detected motion in response to the alert signal 130.

Additionally, in some examples, the control module 110 may detect an object, such as an inanimate object in the vehicle. For example, the control module 110 may detect an inanimate object based on the CSI. In such examples, the CSI may be processed to detect the inanimate object. For instance, the inanimate object (e.g., a sitting person not moving) may be detected if, for example, an area including the inanimate object has been pre-calibrated. In such examples, CSI may be known when the object is not present. Then, when the object is present, additionally CSI may be later obtained and used (along with the known CSI) to detect the object (e.g., something is in the area now). In some examples, the pose of a person even if they are not moving may be detected through pre-calibration and training (e.g., machine learning based). Then, once a detection is made, the control module 110 may transmit the alert signal 130 to the alert module 122 indicative of the detected object. The alert module 122 may then generate and output a vehicle signal, as explained above.

Figure 3:
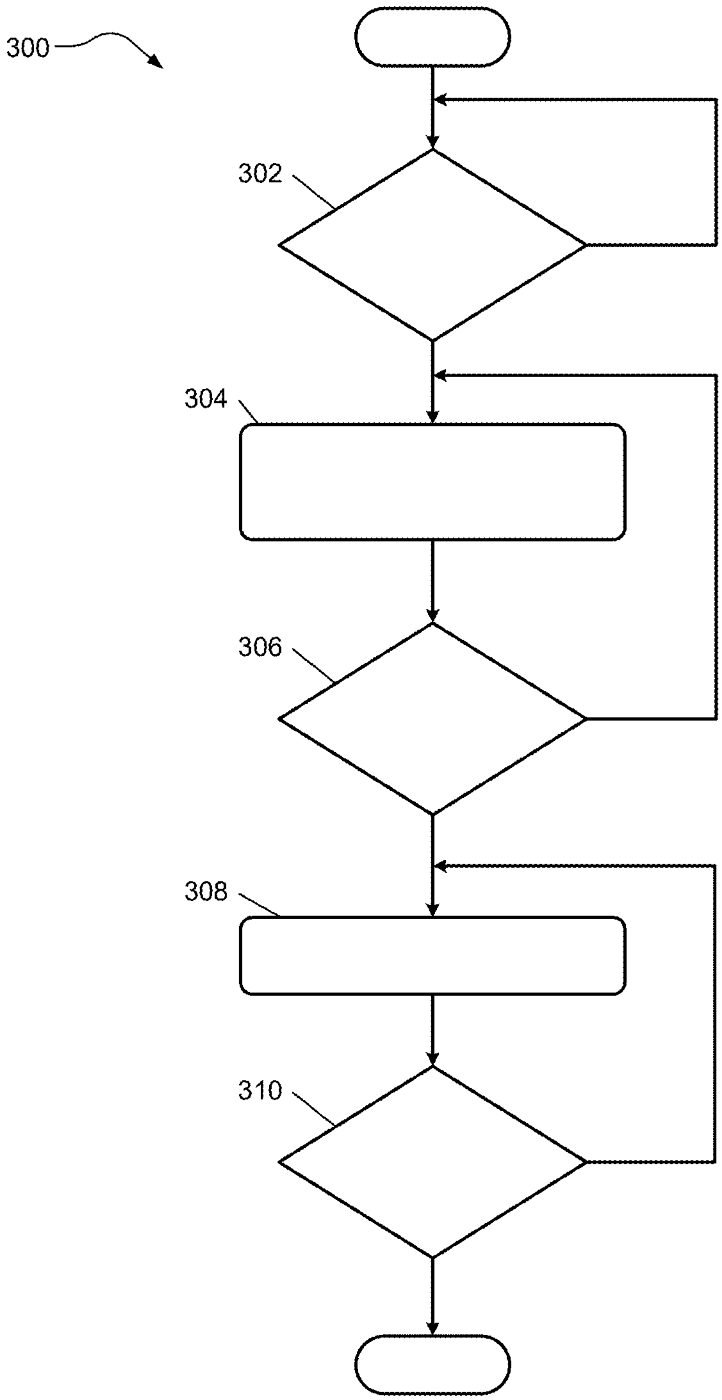
FIGS. 3-4 are flowcharts of example control processes for Wi-Fi sensing with a Wi-Fi sensor module, according to the present disclosure.
Figure 4:
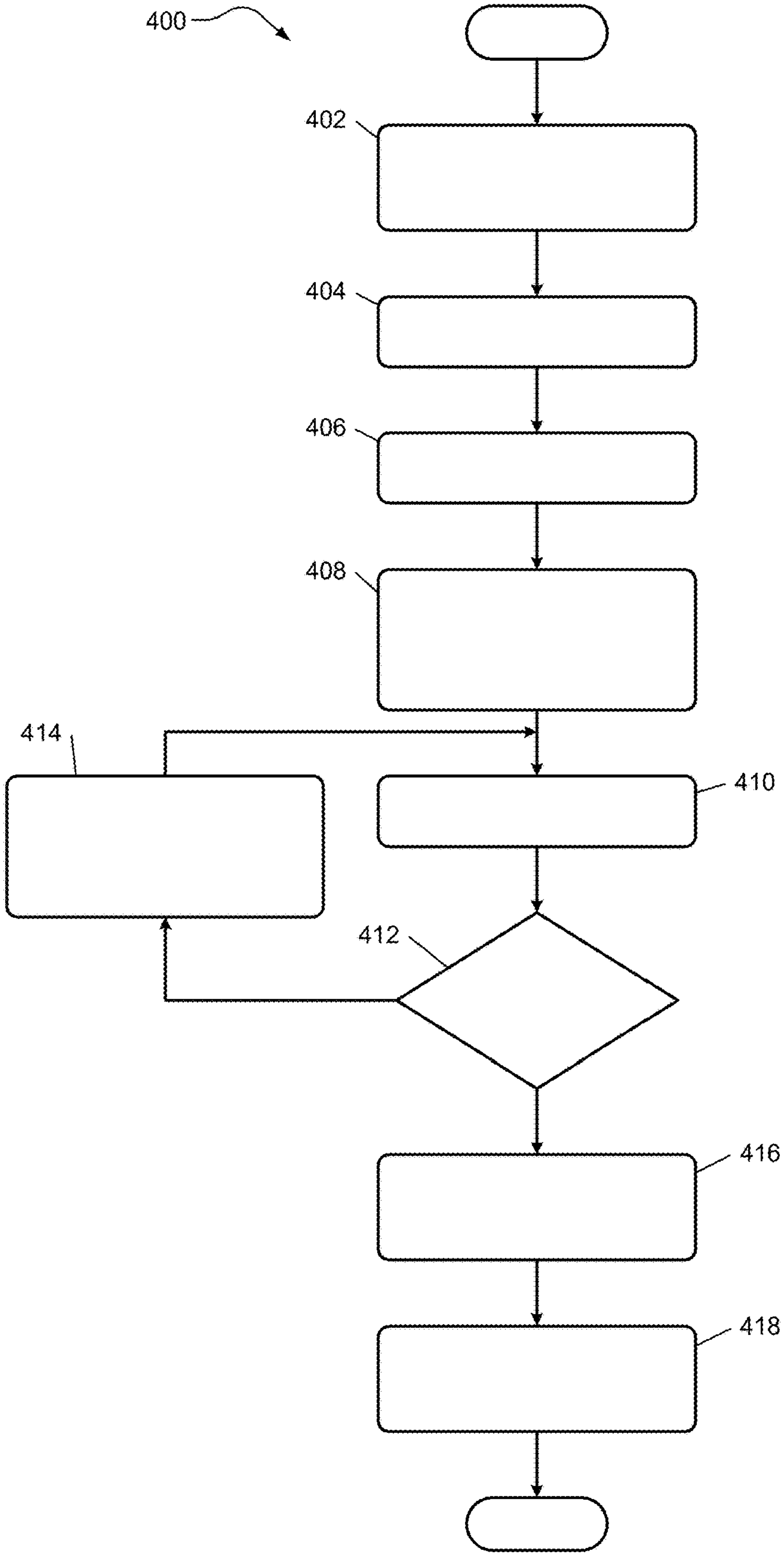

FIGS. 3-4 illustrate example control processes 300, 400 employable by the vehicle system 100 of FIG. 1. Specifically, and as further explained below, the control processes 300, 400 of FIGS. 3-4 relate to Wi-Fi sensing with the Wi-Fi sensor module 102 of FIG. 1 relative to a vehicle (e.g., the vehicle 200 of FIG. 2). Although the example control processes 300, 400 are described in relation to the vehicle system 100 of FIG. 1, any one of the control processes 300, 400 may be employable by another suitable system.

In FIG. 3, the control process 300 begins at 302 where the control module 110 of the Wi-Fi sensor module 102 determines whether the vehicle is parked. For example, and as explained above, the control module 110 make this determination based on a sensed parameter (e.g., a parameter associated with the vehicle's transmission, a velocity sensor, etc.), a received signal indicating the vehicle is in park, etc.

If no (the vehicle is not parked), control returns to 302. If yes (the vehicle is parked), control proceeds to 304.

At 304, the control module 110 activates the in-cabin Wi-Fi sensing. For example, during this implementation, the control module 110 may receive a sensing request for the vehicle (e.g., from a sensing application), determine sensing requirements (e.g., an ordered switching sequence, transmission power adjustments, etc.) for the Wi-Fi sensor antennas 116, 118, 120 of the Wi-Fi sensor module 102 and/or the Wi-Fi antennas 104, 106, 108, control the switching device 114 to sequentially connect the Wi-Fi sensor antennas 116, 118, 120 to the transceiver module 112 based on the sensing requirements, and control the transceiver module 112 to sequentially transmit a Wi-Fi signal to one or more of the Wi-Fi antennas 104, 106, 108 via each connected Wi-Fi sensor antenna. In various embodiments, the implemented in-cabin Wi-Fi sensing may last for any suitable period of time, such as between about 3 seconds and about 10 seconds. Control then proceeds to 306.

At 306, the control module 110 determines whether the sensing request for the vehicle is complete. For example, the sensing request may include a specific number of sensing rounds as explained above. Once the necessary sensing rounds are finished, the sensing request may be completed. If the sensing rounds are not completed at 306, control returns to 304. If yes at 306, control proceeds to 308.

At 308, the control module 110 implements sensing external to the vehicle. For example, and as explained above, the vehicle system 100 may implement external Wi-Fi sensing applications after the sensing request is complete. In such examples, the control module 110 of the Wi-Fi sensor module 102 may control the transceiver module 112 to transmit a Wi-Fi signal to a Wi-Fi antenna (e.g., an auxiliary Wi-Fi antenna) that is used for external sensing. For instance, the Wi-Fi signal to the Wi-Fi antenna may be used to activate a camera, a motion sensor, etc. to detect movement outside of the vehicle. Control then proceeds to 310, where the control module 110 determines whether the external sensing is complete. If no, control returns to 308. Otherwise, control ends.

In FIG. 4, the control process 400 begins at 402 where the control module 110 of the Wi-Fi sensor module 102 receives a sensing request for the vehicle. In various embodiments, the sensing request may be received from a sensing application in the vehicle (e.g., a CPD application, an occupant presence and motion application, a security application, etc.) and include N sensing rounds, as explained above. Control then proceeds to 404.

At 404, the control module 110 determines sensing requirements for the Wi-Fi sensor antennas 116, 118, 120 of the Wi-Fi sensor module 102 and/or the Wi-Fi antennas 104, 106, 108. For example, and as explained above, the sensing sequence requirement may be determined based on the received sensing request and antenna characteristics of the Wi-Fi sensor antennas 116, 118, 120 and/or the Wi-Fi antennas 104, 106, 108. In some examples, the sensing requirements may relate to various parameters for completing the received sensing request, such as an antenna switching schedule, transmission power adjustments, sampling criteria, etc., as explained above. Control then proceeds to 406, where the control module 110 instantiates the sensing request and its sensing rounds.

At 408, the control module 110 implements Wi-Fi sensing with a linked Wi-Fi sensor antenna and one or more Wi-Fi antennas according to the sensing requirements, as explained above. Control then proceeds to 410, 412. At 410, the control module 110 receives one or more reflected signals via the linked Wi-Fi sensor antenna and the transceiver module 112. Then, at 412, the control module 110 determines if any more links exist. If yes at 412, control proceeds to 414 where the control module 110 implements Wi-Fi sensing with the next linked Wi-Fi sensor antenna according to the sensing requirements. Control then returns to 410. If no at 412, control proceeds to 416.

At 416, the control module 110 determines CSI from the received reflected signal(s), as explained herein. Control then proceeds to 418, where the control module 110 may transmit the CSI to the sensing application (or share the CSI with the sensing application) that initially provided the sensing request. Control then ends.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle system for Wi-Fi sensing in a vehicle, the vehicle system comprising:

a plurality of Wi-Fi antennas positioned to focus on different regions of the vehicle, the plurality of Wi-FI antennas including at least one auxiliary Wi-Fi antenna located on an exterior of the vehicle and configured to be used with a sensing application external to the vehicle; and a Wi-Fi sensor module including a plurality of Wi-Fi sensor antennas in communication with the plurality of Wi-Fi antennas, a control module, a transceiver module in communication with the control module, and a switching device in communication with the control module and the transceiver module, each Wi-Fi sensor antenna of the Wi-Fi sensor antennas having at least one antenna characteristic that is different than another one of the Wi-Fi sensor antennas, the control module configured to:

receive a sensing request for the vehicle;

determine sensing requirements for the Wi-Fi sensor antennas based on the sensing request;

determine whether the vehicle is parked;

in response to determining that the vehicle is parked, control the switching device to sequentially connect the Wi-Fi sensor antennas to the transceiver module based on the sensing requirements, wherein one of the Wi-Fi sensor antennas is sequentially connected to the transceiver module at a time;

control the transceiver module to sequentially transmit a Wi-Fi signal to one or more Wi-Fi antennas of the plurality of Wi-Fi antennas via each connected Wi-Fi sensor antenna; and after each of the one or more Wi-Fi sensor antennas have been connected to the transceiver module, control the transceiver module to transmit a Wi-Fi signal to the auxiliary Wi-Fi antenna to activate a camera or a motion sensor for detecting movement external to the vehicle.

2. The vehicle system of claim 1, wherein the control module is configured to determine the sensing requirements based on the sensing request and antenna characteristics of the Wi-FI sensor antennas.

3. The vehicle system of claim 1, wherein the control module is configured to adjust a transmission power of at least one of the sequentially connected Wi-Fi sensor antennas.

4. The vehicle system of claim 1, wherein the control module is configured to receive one or more reflected signals via the Wi-Fi sensor antennas and determine channel state information (CSI) based on the one or more reflected signals.

5. The vehicle system of claim 4, wherein:

the vehicle system further includes an alert module in communication with the control module; and the control module is configured to detect movement in the vehicle based on the CSI and transmit an alert signal to the alert module indicative of the detected movement.

6. The vehicle system of claim 5, wherein the alert module is configured to generate a vehicle signal indicative of the detected movement in response to the alert signal.

7. The vehicle system of claim 1, wherein the antenna characteristic includes at least one of a radiation pattern, a gain, and a directivity.

8. The vehicle system of claim 1, wherein the Wi-Fi antennas include at least a first Wi-Fi antenna positioned to focus on a front cabin portion of the vehicle, and a second Wi-Fi antenna positioned to focus on a rear cabin portion of the vehicle.

9. The vehicle system of claim 1, wherein the control module is configured to control the switching device to sequentially connect each of the Wi-Fi sensor antennas to the transceiver module based on the sensing requirements within a defined period of time.

10. The vehicle system of claim 9, wherein the defined period of time is less than ten seconds.

11. A control method for Wi-Fi sensing with a Wi-Fi sensor module including a switching device, a transceiver module, and a plurality of Wi-Fi sensor antennas in communication with a plurality of Wi-Fi antennas positioned to focus on different regions of a vehicle, the plurality of Wi-Fi antennas including at least one auxiliary Wi-Fi antenna located on an exterior of the vehicle and configured to be used with a sensing application external to the vehicle, the control method comprising:

receiving a sensing request for the vehicle;

determining sensing requirements for the Wi-Fi sensor antennas based on the sensing request;

determining whether the vehicle is parked;

in response to determining that the vehicle is parked, controlling the switching device to sequentially connect the Wi-Fi sensor antennas to the transceiver module based on the sensing requirements, wherein one of the Wi-Fi sensor antennas is sequentially connected to the transceiver module at a time and each Wi-Fi sensor antenna of the Wi-Fi sensor antennas has at least one antenna characteristic that is different than another one of the Wi-Fi sensor antennas;

controlling the transceiver module to sequentially transmit a Wi-Fi signal to one or more Wi-Fi antennas of the plurality of Wi-Fi antennas via each connected Wi-Fi sensor antenna, and after each of the one or more Wi-Fi sensor antennas have been connected to the transceiver module, controlling the transceiver module to transmit a Wi-Fi signal to the auxiliary Wi-Fi antenna to activate a camera or a motion sensor for detecting movement external to the vehicle.

12. The control method of claim 11, wherein determining the sensing requirements includes determining the sensing requirements based on the sensing request and antenna characteristics of the Wi-Fi sensor antennas.

13. The control method of claim 11, further comprising adjusting a transmission power of at least one of the sequentially connected Wi-Fi sensor antennas.

14. The control method of claim 11, further comprising:

receiving one or more reflected signals via the Wi-Fi sensor antennas;

determining CSI based on the one or more reflected signals;

detecting movement in the vehicle based on the CSI; and generating a vehicle signal based on the detected movement.

15. The control method of claim 11, wherein the antenna characteristic includes at least one of a radiation pattern, a gain, and a directivity.

16. A vehicle comprising:

a plurality of Wi-Fi antennas positioned to focus on different regions of the vehicle, the plurality of Wi-Fi antennas including at least one auxiliary Wi-Fi antenna located on an exterior of the vehicle and configured to be used with a sensing application external to the vehicle; and a Wi-Fi sensor module including a plurality of Wi-Fi sensor antennas in communication with the plurality of Wi-Fi antennas, a control module, a transceiver module in communication with the control module, and a switching device in communication with the control module and the transceiver module, each Wi-Fi sensor antenna of the Wi-Fi sensor antennas having at least one antenna characteristic that is different than another one of the Wi-Fi sensor antennas, the control module configured to:

receive a sensing request for the vehicle;

determine sensing requirements for the Wi-Fi sensor antennas based on the sensing request;

determine whether the vehicle is parked;

in response to determining that the vehicle is parked, control the switching device to sequentially connect the Wi-Fi sensor antennas to the transceiver module based on the sensing requirements, wherein one of the Wi-Fi sensor antennas is sequentially connected to the transceiver module at a time;

control the transceiver module to sequentially transmit a Wi-Fi signal to one or more Wi-Fi antennas of the plurality of Wi-Fi antennas via each connected Wi-Fi sensor antenna; and after each of the one or more Wi-Fi sensor antennas have been connected to the transceiver module, control the transceiver module to transmit a Wi-Fi signal to the auxiliary Wi-Fi antenna to activate a camera or a motion sensor for detecting movement external to the vehicle.

17. The vehicle of claim 16, wherein the control module is configured to receive one or more reflected signals via the Wi-Fi sensor antennas and determine channel state information (CSI) based on the one or more reflected signals.

18. The vehicle of claim 17, wherein:

the vehicle further includes an alert module in communication with the control module; and the control module is configured to detect movement in the vehicle based on the CSI and transmit an alert signal to the alert module indicative of the detected movement.

19. The vehicle of claim 18, wherein the alert module is configured to generate a vehicle signal indicative of the detected movement in response to the alert signal.

20. The vehicle of claim 16, wherein the control module is configured to adjust a transmission power of at least one of the sequentially connected Wi-Fi sensor antennas.

* * * * *